United States Patent [19]
Frankland

[11] Patent Number: 5,627,986
[45] Date of Patent: May 6, 1997

[54] DEVICE AND METHOD FOR SELECTING AND ADDRESSING EXTENDED MEMORY ADDRESSES

[75] Inventor: Robert W. Frankland, Laguna Hills, Calif.

[73] Assignee: Rockwell International Corporation, Seal Beach, Calif.

[21] Appl. No.: 352,296

[22] Filed: Dec. 8, 1994

Related U.S. Application Data

[63] Continuation of Ser. No. 937,082, Aug. 31, 1992, abandoned.

[51] Int. Cl.[6] .................... G06F 12/06; G06F 12/10
[52] U.S. Cl. ................... 395/402; 395/405; 395/412
[58] Field of Search ........................ 395/402, 412, 395/421.11, 405

[56] References Cited

U.S. PATENT DOCUMENTS

| | | | |
|---|---|---|---|
| 4,292,668 | 9/1981 | Miller et al. | 395/842 |
| 4,296,467 | 10/1981 | Nibby, Jr. et al. | 395/402 |
| 4,340,932 | 7/1982 | Bakula et al. | 395/402 |
| 4,805,092 | 2/1989 | Cerutti | 395/410 |
| 4,979,144 | 12/1990 | Mizuta | 395/442 |
| 5,010,475 | 4/1991 | Hazawa | 395/403 |
| 5,218,684 | 6/1993 | Hayes et al. | 395/421.09 |

*Primary Examiner*—Eddie P. Chan
*Assistant Examiner*—Reginald G. Bragdon
*Attorney, Agent, or Firm*—George A. Montanye; David J. Arthur; Susie H. Oh

[57] ABSTRACT

An extended memory mapping and selecting scheme for a microprocessor structured with multiple internal address lines. The internal address lines are coupled to external memory devices via a dual port RAM which enables the addresses of the external memories to be mapped and translated into the internal address lines for access by the microprocessor. The memory addressing capability is effectively enhanced by allowing the limited number of internal address lines to address larger external memories having a greater number of address locations.

6 Claims, 7 Drawing Sheets

FIG. 4

| | 7 | 6 | 5 | 4 | 3 | 2 | 1 | 0 | |
|---|---|---|---|---|---|---|---|---|---|
| $IA_{13}$ | 1 | 0 | 1 | 0 | 1 | 0 | 1 | 0 | |
| $IA_{14}$ | 1 | 1 | 0 | 0 | 1 | 1 | 0 | 0 | |
| $IA_{15}$ | 1 | 1 | 1 | 1 | 0 | 0 | 0 | 0 | |
| $CS_3$ | 1 | 0 | 1 | 1 | | | | | $D_7$ |
| $CS_2$ | 1 | 1 | 0 | 1 | | | | | $D_6$ |
| $CS_1$ | 0 | 1 | 1 | 1 | | | | | $D_5$ |
| $CS_0$ | 1 | 1 | 1 | 0 | | | | | $D_4$ |
| $EA_{16}$ | 1 | 0 | 0 | 0 | | | | | $D_3$ |
| $EA_{15}$ | 1 | 0 | 1 | 1 | | | | | $D_2$ |
| $EA_{14}$ | 1 | 0 | 1 | 1 | | | | | $D_1$ |
| $EA_{13}$ | 1 | 1 | 1 | 0 | | | | | $D_0$ |
| $IA_0$ | 1 | 0 | 1 | 0 | 1 | 0 | 1 | 0 | |
| $IA_1$ | 1 | 1 | 0 | 0 | 1 | 1 | 0 | 0 | |
| $IA_2$ | 1 | 1 | 1 | 1 | 0 | 0 | 0 | 0 | |

| PORT Y ADDRESS | | | PORT Y DATA | | | | | | | | |
|---|---|---|---|---|---|---|---|---|---|---|---|
| IA13 | IA14 | IA15 | EA13 | EA14 | EA15 | EA16 | CS0 | CS1 | CS2 | CS3 | |
| 1 | 1 | 1 | 1 | 1 | 1 | 0 | 0 | 1 | 1 | 1 | 7 |
| 0 | 1 | 1 | 0 | 1 | 1 | 0 | 0 | 1 | 1 | 1 | 6 |
| 1 | 0 | 1 | 1 | 0 | 1 | 0 | 0 | 1 | 1 | 1 | 5 |
| 0 | 0 | 1 | 0 | 0 | 1 | 0 | 0 | 1 | 1 | 1 | 4 |
| 1 | 1 | 0 | 1 | 1 | 0 | 0 | 0 | 1 | 1 | 1 | 3 |
| 0 | 1 | 0 | 0 | 1 | 0 | 0 | 0 | 1 | 1 | 1 | 2 |
| 1 | 0 | 0 | 1 | 0 | 0 | 0 | 0 | 1 | 1 | 1 | 1 |
| 0 | 0 | 0 | 0 | 0 | 0 | 0 | 0 | 1 | 1 | 1 | 0 |

FIG. 6

DEVICE AND METHOD FOR SELECTING AND ADDRESSING EXTENDED MEMORY ADDRESSES

This is a continuation of application of Ser. No. 07/937,082 filed on Aug. 31, 1992, now abandoned.

BACKGROUND OF THE INVENTION

1. Field of the Invention

The present invention extends memory capacity of a microprocessor while permitting the software writer to access any blocks of externally stored information by addressing the internal memory blocks of the microprocessor.

2. Prior Art

Prior art techniques are known for extending the memory capacity of a microprocessor by incorporating external memory without appreciably disturbing the conventional rules for writing software.

The first of these techniques uses chip select or bank memory lines, to assist in extended addressing, and the second additionally employs address translation, using polarity grouping and logic in the address lines.

A typical prior art microprocessor may have a 65,536 (generally called 64K) address memory divided into locations for eight 8K blocks of address memory, numbered 0–7. Three Address lines A13, A14, and A15 are required to obtain the 8K block resolution, and thirteen (A0–A12) additional address lines resolve the 65,536 addresses or locations of the eight 8K blocks. If 4K resolution is desired, address lines A12–A15 may be designated to provide additional addressing capability.

Various combinations of logic circuits on an external chip are required to extend this addressing to external memory. However, these are all hard wired circuits which cannot be programmable or changed by the programmer.

As many as 11 logic exclusive OR circuits, inverters, and NAND circuits have been employed in various combinations of the address lines to accommodate the addressing of external memories from a single microprocessor. These are fixed for the life of the microprocessor, and offer little flexibility.

SUMMARY OF THE INVENTION

The invention substantially increases the microprocessor available memory by incorporating large memories on extra memory chips in a manner permitting the software programmer/user programmable access to blocks of data from any external memory without complicating the addressing function, nor hard wiring the memories.

A matrix address decode memory, extra address line and chip selects make any block of information from a number of very large external memories available to the software programmer/user by addressing the microprocessor's internal addresses.

A dual port RAM may be used as the memory matrix. By way of example, for a microprocessor with 64K internal address memory, eight blocks of 8K are internally addressed, using 3 address bit lines A0, A1, and A2 capable of eight unique bit patterns.

The memory matrix has an 8 bit by 8 bit address translation section programmable by the programmer at anytime after initialization. The 8 rows correspond to the eight block designation of the internal microprocessor addresses, e.g., 0–7, and of the bit positions in each row. The 8 columns represent the particular data addresses for the desired blocks of data for each selected chip. Four columnar address bits are provided for addressing the available data locations in the external memories. Consequently, 128K memory chips, for example, may be addressed, thereby enabling the selection of single blocks of the external memories which may have twice the address availability as the typical 64K internal addressing capabilities.

The remaining four columnar bit locations designate the particular memory or device to be selected thereby identifying a specific 8K block in one of the added external memories.

Thirteen address lines will address 8192 (8K) data locations, so address lines A0–A12 extend directly from the internal address memory to any selectable 8K block of the external memories. Lines A13, A14, and A15 identify the output side of the eight levels of rows in the matrix, the same as A0, A1, and A2 identify the internal blocks of the microprocessor addresses on the input side.

The programmer uses 8 microprocessor data lines to write the address of any 8K block of data in external memory into the address translation rows by way of the RAM input port. The addressed data then appears at the respective eight, 8K internal addresses in the microprocessor. In reality, eight data lines extending from these same eight rows of the matrix via the output port are addressed to the selected external memory 8K blocks.

Any software may be written in terms of the internal address bus. When the a program accesses a memory location it does so in terms of IA0–IA15, equivalent to 65,536 locations. On the other hand, the memory devices connected to the microprocessor externally are addressed in terms of the external address bus EA0–EA 16, to address 128K (really 128+K). The chip select bits are used to select additional external 128K or less memories, and also to control the number of extended clock cycles to be used with the selected device. The principles of the invention permit the use of wide ranges of internal and external addressing other than the example presented.

BRIEF DESCRIPTION OF THE DRAWINGS

FIG. 4 illustrates the use of four address lines to delineate the 128K memory addresses into respectively halves, quarters, eighths, and sixteenths;

FIG. 5 illustrates the bit notations of the eight data lines for programmed addressing any 8K location in the four data 128K memories corresponding to the eight, 8K bit blocks of the internal address memory; and, FIG. 6 shows a chart of all data bits in the memory matrix automatically preset so the programmer knows where to start programming when the power comes on.

DESCRIPTION OF THE PREFERRED EMBODIMENT

In the present example, the internal memory address capability includes 64K of addresses divided into eight blocks of 8K each, thus each internal block being addressable by a binary map of eight different combinations made possible by three address lines. The external memory to be added will be preferably four 128K memories which may be RAMs, ROMs, or other devices.

Figure 1:
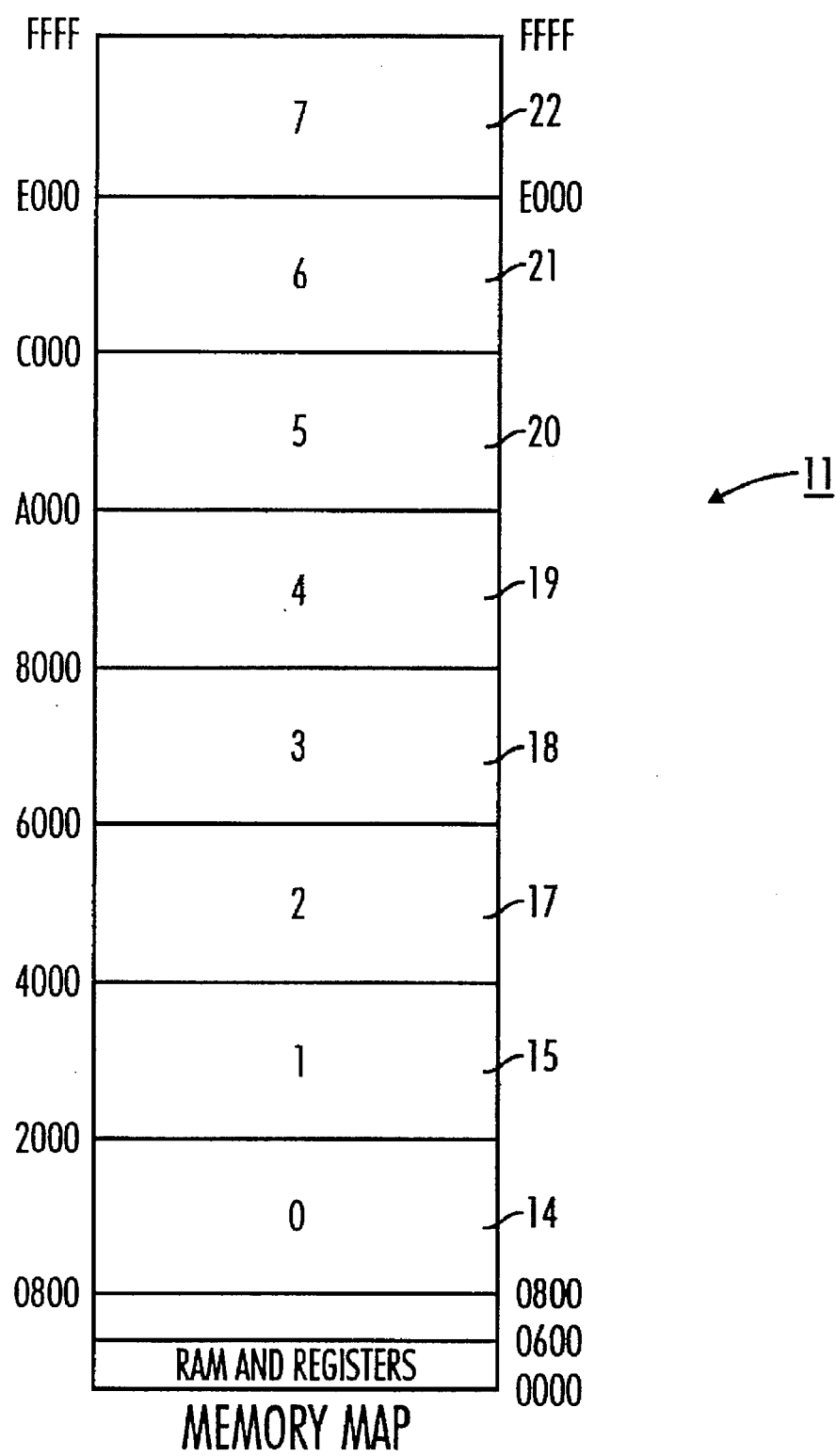
FIG. 1 is a typical 64K address bus divided into eight, 8K blocks and addressed in hexadecimal.

In FIG. 1, the eight 8K blocks, or compartments, comprising 64K addresses are shown at 11 having a zero (0) compartment 14 with 8,000 memory locations reached by addressing in hexadecimal 0000 up to 2000. Next, block 1, shown at 15, includes addresses between 2000 and 4000. Block 2, shown at 17, is disposed between 4,000 and 6,000 with block 3, shown at 18, between 6,000 and 8,000, block 4, shown at 19, between 8,000 and A000, block 5, shown at 20, between A000 and C000, block 6, shown at 21, between C000 and E000, and block 7, shown at 22, between E000 and FFFF.

Figure 1A:
FIG. 1A illustrates the address boundaries held in each of the eight 8K blocks.

These address blocks are shown in FIG. 1A at 11 with the 8K locations respectively appearing in block 0, block 1, block 2, block 3, block 4, block 5, block 6, and block 7 containing addresses between 0 to 8K in block 0, 8K to 16K in block 1, 16K to 24K in block 2, 24K to 32K in block 3, 32K to 40K in block 4, 40K to 48K in block 5, 48K to 56K in block 6 and 56K to 64K in block 7.

Figure 1B:
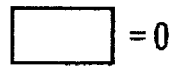
FIG. 1B is/a memory map of eight addresses capable of uniquely identifying each block of FIG. 1A.

An example of a memory map 31 with 3 address leads A13 (least significant), A14, and A15 is shown in FIG. 1B. A potential of 5 volts on the line is a binary 1, (shaded dark) and a potential of 0 volts is binary 0, (white). Thus, looking at map 31, the region opposite block 0 contains 000 because all leads A13 through A15 are at 0 volts. The next row corresponding to block 1 is 001 which in binary code equals 1. Block 2 shows only lead A14 high to comprise 2. Block 3 corresponds to A14 and A13 high, providing 3. This binary code extends up to block 7 which is designated 111 with all three leads selected or high.

Figure 2:
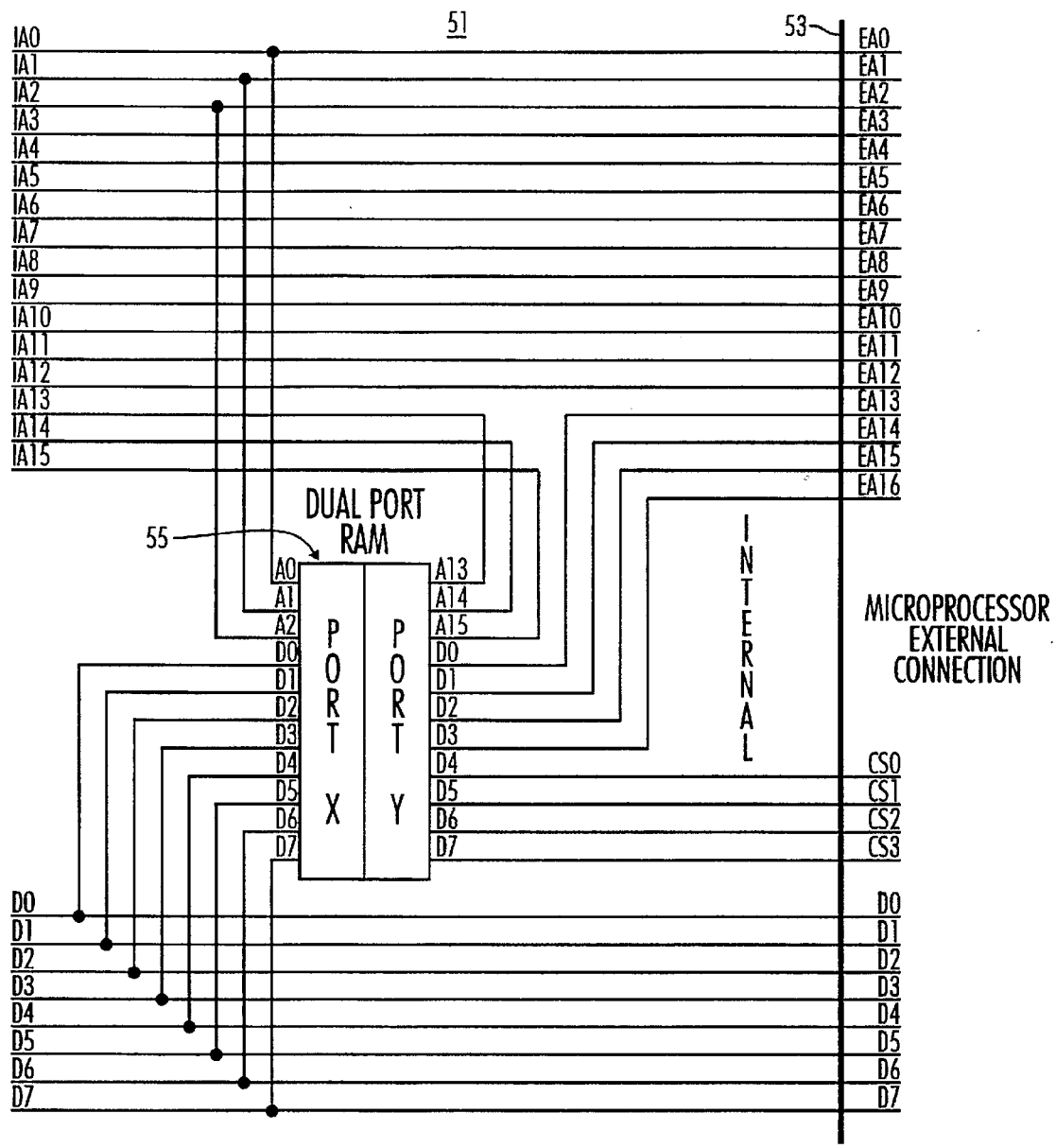
FIG. 2 shows the inclusion of a programmable memory matrix within a microprocessor showing the straight through address lines from internal to external connections and data lines being used as internal programming lines and as external memory addressing lines.

In FIG. 2, it will be seen that the microprocessor 51 is to the left of vertical line 53 so that everything to the left is internal and to the right of line 53 is external. The internal leads IA0 through IA12 extend directly through to the external memory and comprise external address leads EA0 through EA12. These 13 leads may comprise a memory map, similar to but much more extensive than FIG. 1B, which includes 8,000 different combinations for each address block of 8K, or 64K total addresses.

In the present example, the memory matrix 55 is shown as a dual port RAM having port X which is "write" and output port Y which is "read." Port X is addressed by the microprocessor address lines IA2, IA1, and IA0 which decode 8 by 8K blocks of the 64K address bus 11 (FIG. 1). Note that address lines IA0–IA12 extend straight through from the microprocessor 51 to the microprocessor external connections EA0–EA12, shown to the right of partition 53. The bit pattern for EA0–EA12 will be true. That is, the address bits will be directly transferred from IA0–IA12 to EA0–EA12 in the external memory, such that the addresses of the external lines comprise a true map of the internal lines. However, EA15, EA14, and EA13 will be replaced by the contents of corresponding registers of port Y in the dual port RAM. This is the basic technique for mapping an 8K block of memory into any other 8K block of address location within the 64K bus by address translation of three address locations.

In addition to the EA13, EA14, and EA15 bits, chip selection may be performed using the remaining five bits of the dual port RAM registers of port Y (i.e., EA16, CS0, CS1, CS2 and CS3), indicated in FIG. 2. The CS bits select various extended or supplemental external memories, while the EA16 bit effectively does the same by including a fourth address bit which allows a larger number of address locations, beyond the internal 64K addresses, to be addressed. For example, when only three address bits are used to address a memory location, the size of the memory is limited to 64K. However, by adding a fourth bit, the address capability is increased two-fold, to 128K.

Functionally, the extended address and chip select lines are interchangeable in that the CS3 line could serve, for example, as an EA17 line to select an even larger 256K device (rather than a 128K external memory). However, the EA16 line cannot function in all of the same capacities as the four CS bits which control the number of extended clock cycles to be applied to the selected memory device which, in turn, affect the speed of operation, since EA16 is not associated with speed selection.

That is, the speed of operation of the microprocessor is proportional to the clock oscillator frequency. Two speed select bits or lines, are provided for each CS bit. The two speed select bits control the clock cycle adjustment, i.e., speed select, function. The speed can be reduced by adding one, two, or three clock cycles to the fundamental clock cycle. For example, if both speed select lines are in the low state, no extended clock cycles will be applied. Consequently, the controller runs at the fundamental frequency, or at "normal" speed. When both lines are high, three clock cycles are added to the fundamental cycle, and the controller runs at one quarter of the fundamental clock frequency. Expressed numerically, a value of 00 indicates that no extended clock cycles are required, 01 is one, 10 are two, and 11 extends the fundamental clock frequency by three additional cycles.

Port Y address of the chip select registers is mapped into zero page so that each register may be reconfirmed simply by a "STORE IMMEDIATE" of the new address translation and chip select. Power on reset automatically enters default values into the registers so that the microprocessor finds only one enable device at the reset vector.

In preferred embodiments, the microprocessor occupies 0000–03FF and the data pump 0400–07FF. The dual port RAM has CS0 as dedicated chip select. When the address range 0000–1FFF is addressed through the registers, only the 0800–1FFF range produces a chip select.

To fully optimize the input-output usage, a select register is available to configure the five associated microprocessor output lines as CS/EA16 or as general purpose input-output for those which are not required as chip selects.

The foregoing may be seen from FIG. 2 wherein the programmer, programs an 8 by 8 bit section (FIG. 5) of the dual port RAM by way of port Y data leads D0–D7. The D0 data line exits port Y of RAM 55 to become EA13 at the microprocessor external connection, beyond 53. Similarly, port Y data line D1 becomes EA14 and D2 becomes EA15.

The next data lead D3 becomes EA16 which is the external lead which enables the selection of one of the 128K external memories.

Figure 3:
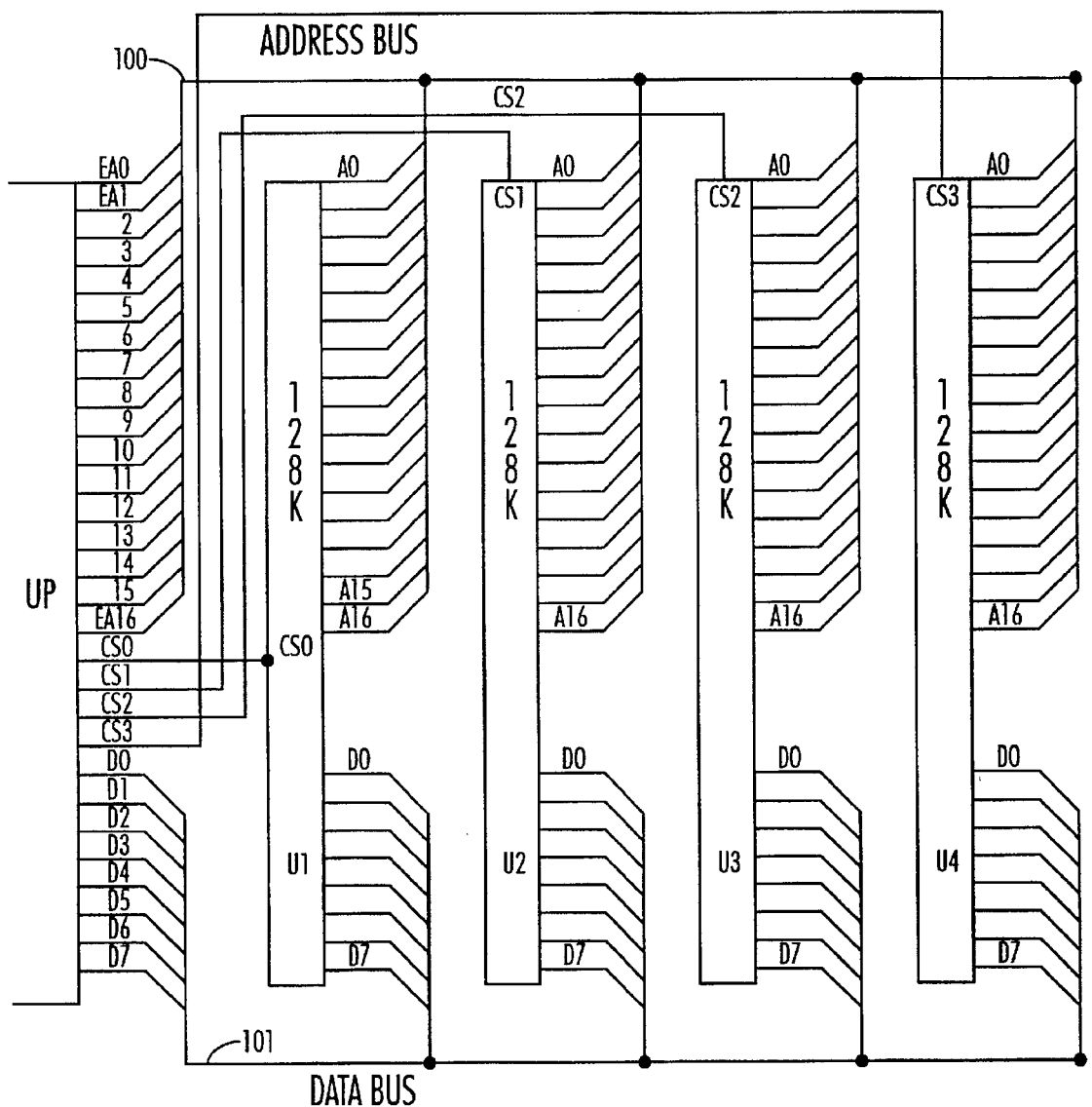
FIG. 3 is an extension of FIG. 2 to show the address lines, data lines, and chip select lines extending respectively to four 128K external memories or devices.

The remaining data leads from port Y, namely D4 through D7, become CS0, CS1, CS2, and CS3, respectively, at the external connections of the microprocessor (FIG. 3).

In FIG. 3, by way of example, four 128K external memories U1, U2, U3 and U4 are addressable via the memory matrix of FIG. 5. It can be seen that external microprocessor leads EA0–EA16 comprise address bus 100 which extends to each of U1, U2, U3 and U4. Chip select CS0 is connected only to memory U1 with CS1, CS2, and CS3 being connected to memories U2, U3 and U4, respectively. Data leads D0–D7 are connected in data bus 101.

Figure 4:
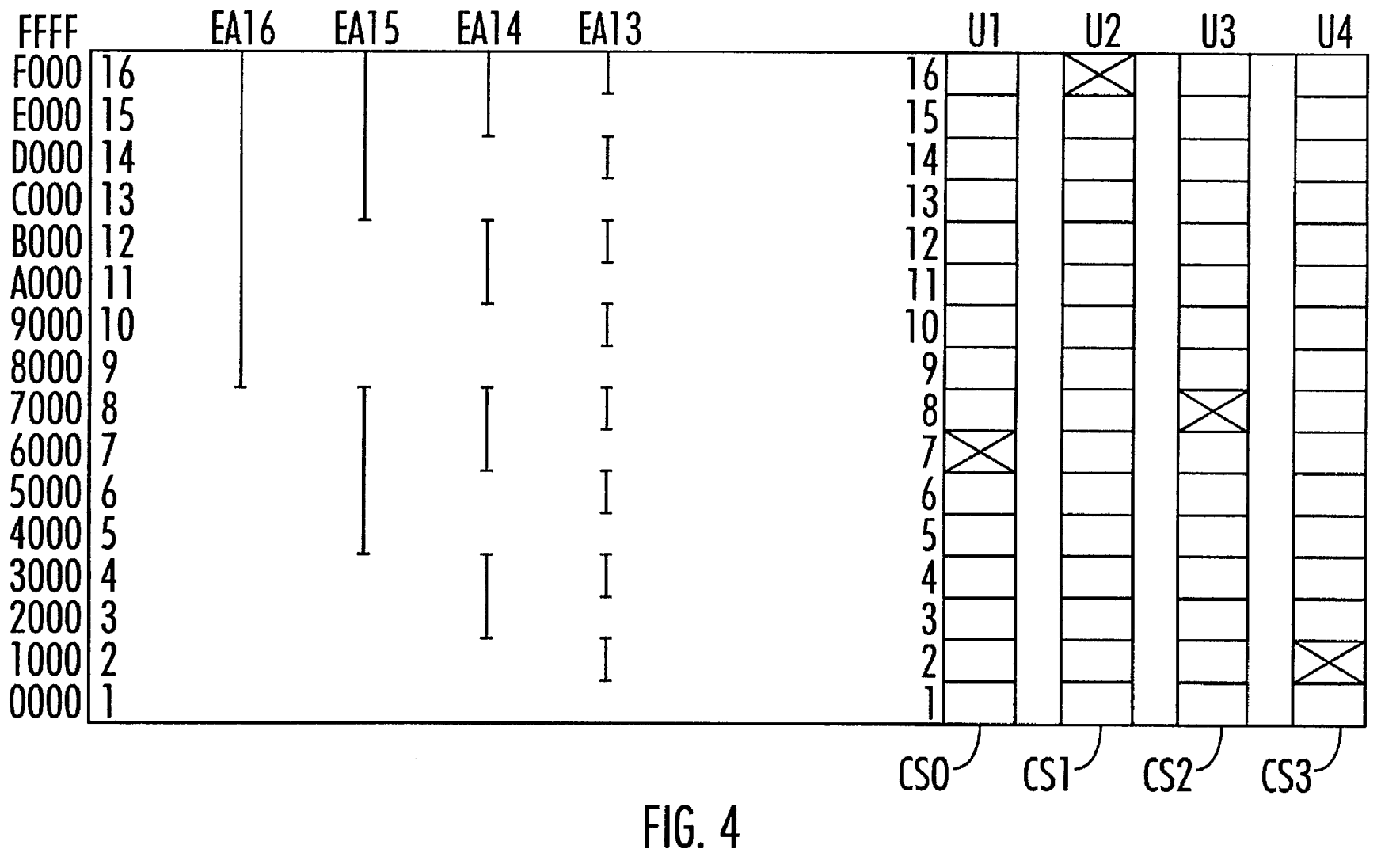

Next, FIG. 4 will be used to explain the select functions of EA16, EA15, EA14, and EA13. It can be seen that the EA16 line extends from FFFF down to 8000, i.e., one half of the memories U1, U2, U3, U4 in order that 64K can be selected from each of these memories.

Similarly, EA15 is defined to select the first quarter and the third quarter of each 128K memory U1–U4.

EA14 is provided to select equally-spaced one-eighth intervals of each of the U1 through U4 memories, and EA13 is provided to select spaced sixteenths of each of those memories.

If EA16, EA15, EA14, and EA13 are all "1s," the only compartments of U1 through U4 selectable are the top compartments labeled 16 (at the left). For example, to select a single memory, one of CS0, CS1, CS2, or CS3 is enabled (made 0 which is opposite to selecting EA16, EA15, EA14, or EA13) and a single block or compartment, such as block U2/16 selected by CS1, is reached by the programmer.

More particularly, according to binary-coded values for each of the sixteen addresses EA0–EA16, the address location of a particular block of any selected memory may be called up, or addressed. For example, as shown in FIG. 4, if block 7 of U1 is being addressed, the corresponding binary values for EA16, EA15, EA14, and EA13 would be 0, 1, 1, 0, respectively, and the CS0 corresponding to U1 would be enabled, e.g., 0. Thus, as discussed in more detail below with regard to FIG. 5, it will be seen that by enabling the particular chip select bit for a desired memory device, the exact location of any desired data address can be input by the software programmer and retrieved by the microprocessor.

FIG. 5 shows the exact programming available to the programmer to reach the compartments marked by Xs in FIG. 4, by way of example. In FIG. 5, it will be seen that the three address lines IA2, IA1, IA0 identify the eight blocks of the microprocessor internal 64K addressing capability. Reference to FIG. 2, shows the three lines from IA0 through IA2 extending down to port X of dual port RAM 55 to provide the selection of 0 through 7 in binary beneath the IA2, IA1, and IA0 columns of FIG. 5. Similarly in FIG. 2, the external addressing of EA13, EA14, and EA15 extend from port Y over D0, D1, and D2. As shown in FIG. 5, and the addressing of IA15 through IA13 corresponds to the addresses of IA2 through IA0.

If the programmer wishes to communicate with block 16 of external memory U2 at block 7 of the internal 64K address blocks, the programmer enters a 1 in D0, D1, D2, and D3 which activates the defined address connections of FIG. 4, as previously explained, i.e., EA16 is a 1, EA15 is a 1, EA14 is a 1, and EA13 is a 1, thereby uniquely selecting the upper compartment of any of the memories U1 through U4.

Under CS0 in FIG. 5, the programmer enters a "1" thereby not selecting the U1 memory. However, the programmer enters a "0" under CS1 to select the U2 memory thus substituting the contents of U2/16 for location 111 (FIG. 1A) in the internal 64K memory. Of course, D6 and D7 are each 1 because CS2 and CS3 are also not selected.

In the next example of FIG. 5, the programmer desires to map the contents of external memory U4 block 2 to internal memory block 6. Accordingly, the programmer enters a 1 in EA13 or D0 to select block 2 of one of the selected memories among U1 through U4 (FIG. 4). However, none of the other addresses define this block, so EA14, EA15 and EA16, corresponding to D1, D2, and D3, are entered as "0s" in the chart of FIG. 5. Next, it is desired not to select memories U1, U2, or U3 so the chip selects C0, CS1 and CS2 of FIG. 5 are entered as "1s" and the selected memory U4 is selected by a "0" under CS3, D7.

In the next example, the block 8 of memory U3 is mapped to block 5 of the internal memory 11 of FIG. 1A, as mapped in FIG. 1B.

The program replaces "1s" in the first three bits of the horizontal 8-bit positions in FIG. 5 underneath, respectively, EA13, EA14, and EA15 because all of these addresses reach block 8 of U3 as seen in FIG. 4. EA16 of FIG. 5 is "0" because, in FIG. 4, EA16 does not address the lower eight blocks of each memory. CS0 through CS3 are 1101 because only memory U3, selected by CS2, is desired to be reached, so it is designated by a binary "0".

Finally, in the fourth example, block 7 of 128K memory U1 is mapped into block 4 of the internal microprocessor memory, designated 100 in FIG. 5. Looking at FIG. 4, EA13 is "0" because it does not address any of the block "7s" of the memories U1 through U4. EA14 on, data lead D1, is "1" because it does overlap block 7 of U1 in FIG. 4. EA15, over data lead D2, is "1" because in FIG. 4 it does overlap all block "7s" of all the memories U1 through U4. EA16, on data lead D3, is "0" because it is not concerned with the lower eight blocks of memories U1 through U4. However, CS0, on data line D4, is "0" because memory U1 is selected. The remaining chip selects CS1, CS2 and CS3 are "1s" because they are not selected.

The chart of FIG. 6 illustrates an example format of predetermined initialization bits placed into the memory matrix upon "POWER ON" in order that the programmer knows where to start programming.

The table of FIG. 6 shows the chip select line CS0 equal to zero in all eight locations which preselects CS0. The other chip selects CS1–CS3, are deselected in all eight locations as indicated by "1" bits.

By reading the table of FIG.6, with the layout address of FIG. 4, it becomes readily apparent that the microprocessor is automatically initialized to read block 8 of memory U1 for the microprocessor block 7, block 7 of memory U1 for microprocessor block 6, block 6 of memory U1 for microprocessor block 5, block 5 of memory U1 for microprocessor block 4, block 4 of memory U1 for microprocessor block 3, block 3, of memory U1 for block 2 of microprocessor, block 2 of memory U1 for block 1 of the microprocessor, and block 1 of memory U1 for the block 0 of the microprocessor. These, of course, are the substitutions that would be made if the programmer did nothing to alter the automatic preset condition, and so blocks 8 through 1 of memory U1 would replace blocks 7 through 0 of the microprocessor address memory.

Using this system of addressing, it is apparent that the software programmer or user can reset the contents of the memory matrix represented by the 8-bit by 8-bit register of FIG. 5 at will for the register in its entirety, or for any horizontal row or rows thereof.

It will be recognized that mixed memory devices can be accommodated using blocks of 4K, 8K or other amounts as is also true in the external memory capacities accommodated.

The dual port RAM need not be used but can be constructed of a memory having input and output ports, as well as, an input register and an output register, or equivalents thereof. Accordingly, it will be recognized that the chip select bits may be dedicated to a variety of electronic devices. For example, the CS0 bit may represent an EPROM or other program storage memory device.

Also, it should now be apparent that the EA16 address line is only necessary if one of the external memories is larger in capacity than the internal addressing capability. For example, several external memories up to 64K could be used without the EA16 lead but still benefit greatly from the programmable feature of this invention because blocks of external memory could be moved around in any desired configuration and still be addressed with ease based on the internal blocks.

I claim:

1. A memory address mapping and access speed selection apparatus for accessing a plurality of external memories with an internal address of a microprocessor, the apparatus comprising:

X external address lines connected to the plurality of external memories;

a chip select line connected to each external memory, said chip select line selecting which memory will be addressed during a particular access;

Y internal address lines connected to a microprocessor;

Z data lines connected to the microprocessor and each of the plurality of extended memories;

a dual-port random access memory (DPRAM) having a write port and a read port;

said write port having inputs connected to M of the internal address lines, where M is less than Y, said write port further connected to the Z data lines from the microprocessor, wherein the microprocessor inputs data during a programming mode over the Z data lines into the dual-port random access memory at dual-port random access memory addresses indicated by the M internal address lines, wherein the data input into the dual-port random access memory addresses includes high order address bits of an external memory, address and a chip select value indicating a particular one of the plurality of external memories;

said read port having outputs connected to N of the external address lines, where N is less than X, said read port outputting high order address bits and a particular chip select signal of a particular external memory when an internal address value is input to the write port over the M internal address lines during a non-programming access; and wherein the particular chip select value output by the read port of the dual-port random access memory during a non-programming access is utilized in selecting the speed of access to the particular external memory.

2. The memory address mapping and access speed selection apparatus of claim 1, further comprising:

means for initializing the dual-port random access memory addresses, upon the power on/reset of the microprocessor, to predetermined values.

3. The memory, address mapping and access speed selection apparatus of claim 1, wherein M equals 3.

4. A method of memory address mapping and access speed selection for accessing a plurality of external memories with an internal address of a microprocessor the method comprising:

programming a write port of a dual-port random access memory (DPRAM) having inputs connected to M internal address lines of the microprocessor, said microprocessor having Y internal address lines and where M is less than Y, said write port further connected to Z data lines from the microprocessor, wherein the microprocessor inputs data during a programming mode over the Z data lines into the dual-port random access memory at addresses indicated by the M internal address lines, the data input into the dual-port random access memory addresses including high order address bits of an external memory address and a chip select value indicating a particular one of the plurality of external memories;

accessing a read port during a non-programming mode, said read port having outputs connected to N external address lines of the external memories, each external memory having a total of X address lines where N is less than Y, said read port outputting high order address bits and a particular chip select value of a particular external memory when an internal address value is input to the write port over the M internal address lines during the access; and selecting a speed of access to the particular external memory based on the particular chip select value output by the read port of the dual-port random access memory during the access.

5. The method of memory address mapping and access speed selection of claim 4, further comprising the step of:

initializing the dual-port random access memory addresses to predetermined values upon microprocessor power on/reset.

6. The memory address mapping and access speed selection method of claim 4, wherein M equals 3.

* * * * *